(12) United States Patent
Hwang

(10) Patent No.: US 11,209,284 B2
(45) Date of Patent: Dec. 28, 2021

(54) SYSTEM AND METHOD FOR CREATING DRIVING ROUTE OF VEHICLE

(71) Applicants: HYUNDAI MOTOR COMPANY, Seoul (KR); KIA MOTORS CORPORATION, Seoul (KR)

(72) Inventor: Jae Pil Hwang, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 269 days.

(21) Appl. No.: 15/996,858

(22) Filed: Jun. 4, 2018

(65) Prior Publication Data
US 2019/0186940 A1 Jun. 20, 2019

(30) Foreign Application Priority Data
Dec. 18, 2017 (KR) .................... 10-2017-0174288

(51) Int. Cl.
*G01C 21/34* (2006.01)
*B60W 30/18* (2012.01)
(Continued)

(52) U.S. Cl.
CPC ....... *G01C 21/3492* (2013.01); *B60W 30/095* (2013.01); *B60W 30/18163* (2013.01);
(Continued)

(58) Field of Classification Search
CPC .......... B62D 15/0265; B62D 15/0255; B60W 30/095; B60W 30/18163; B60W 30/0956; B60W 2554/4045; B60W 2554/4042; B60W 2554/805; B60W 2554/802; B60W 2554/801; B60W 2554/80; B60W 30/00–20; B60W 50/00–16; B60W 60/00–007; G01C 21/3492; G01C 21/3658; G01C 21/3407; G01C 21/3446;
(Continued)

(56) References Cited

U.S. PATENT DOCUMENTS 6,035,053 A * 3/2000 Yoshioka ................ G01S 13/42
382/104
7,289,019 B1 * 10/2007 Kertes .................... B60Q 9/008
340/435
(Continued)

FOREIGN PATENT DOCUMENTS

KR 10-2017-0070395 A 6/2017
WO WO-2020113187 A1 * 6/2020 ........ B60W 60/0027

*Primary Examiner* — Angelina Shudy
*Assistant Examiner* — Mohamed Abdo Algehaim
(74) *Attorney, Agent, or Firm* — Lempia Summerfield Katz LLC

(57) ABSTRACT

A system for creating a driving route of a vehicle includes: a vehicle selecting device to select a surrounding vehicle that is adjacent to a host vehicle; an intention determining device to determine an intention of the surrounding vehicle by using information including a location and a speed of the surrounding vehicle; a driving route predicting device to predict a driving route of the surrounding vehicle based on the determined intention of the surrounding vehicle; a map creating device to create a map by using the predicted driving route of the surrounding vehicle; and a driving route creating device to create a driving route of the host vehicle.

10 Claims, 10 Drawing Sheets

(51) Int. Cl.
*B60W 30/095* (2012.01)
*G08G 1/16* (2006.01)
*G01C 21/36* (2006.01)
*B62D 15/02* (2006.01)

(52) U.S. Cl.
CPC ..... *B62D 15/0255* (2013.01); *B62D 15/0265* (2013.01); *G01C 21/3407* (2013.01); *G01C 21/3446* (2013.01); *G01C 21/3461* (2013.01); *G01C 21/3658* (2013.01); *G08G 1/167* (2013.01)

(58) Field of Classification Search
CPC .... G01C 21/3461; G08G 1/167; G06K 9/623; G06K 9/00825; G05D 1/00–12
USPC .......................................................... 701/423
See application file for complete search history.

(56) References Cited

U.S. PATENT DOCUMENTS

| | | | | |
|---|---|---|---|---|
| 8,401,788 B2* | 3/2013 | Kondoh | ................ | G01C 21/28 701/505 |
| 8,493,195 B2* | 7/2013 | Lee | ................ | B60W 40/04 340/435 |
| 8,676,487 B2* | 3/2014 | Sakai | ................ | B60W 40/02 701/300 |
| 9,098,753 B1* | 8/2015 | Zhu | ................ | G06K 9/00805 |
| 9,199,668 B2* | 12/2015 | Zeng | ................ | G01S 7/4808 |
| 9,415,776 B2* | 8/2016 | Schwindt | ................ | B60W 30/09 |
| 9,607,226 B2* | 3/2017 | Zhu | ................ | G06K 9/00805 |
| 9,868,443 B2* | 1/2018 | Zeng | ................ | B60W 30/0956 |
| 10,347,127 B2* | 7/2019 | Droz | ................ | B60W 50/0098 |
| 10,404,261 B1* | 9/2019 | Josefsberg | ................ | G01S 13/931 |
| 10,864,819 B2* | 12/2020 | Hubbard | ................ | B60W 40/08 |
| 2002/0049539 A1* | 4/2002 | Russell | ................ | B60W 50/0097 701/301 |
| 2006/0095193 A1* | 5/2006 | Nishira | ................ | B60T 7/22 701/96 |
| 2009/0037088 A1* | 2/2009 | Taguchi | ................ | B60W 30/095 701/117 |
| 2010/0225521 A1* | 9/2010 | Mochizuki | ................ | G01S 13/726 342/70 |
| 2011/0033127 A1* | 2/2011 | Rasmusson | ................ | H04N 19/11 382/238 |
| 2011/0313664 A1* | 12/2011 | Sakai | ................ | B60W 30/08 701/301 |
| 2014/0324312 A1* | 10/2014 | Okuya | ................ | G08G 1/017 701/70 |
| 2014/0358840 A1* | 12/2014 | Tadic | ................ | B60R 21/0136 706/52 |
| 2015/0120138 A1* | 4/2015 | Zeng | ................ | G01S 7/4808 701/41 |
| 2015/0269844 A1* | 9/2015 | Arndt | ................ | G08G 1/167 340/435 |
| 2015/0310281 A1* | 10/2015 | Zhu | ................ | G06K 9/00805 382/104 |
| 2016/0026182 A1* | 1/2016 | Boroditsky | ................ | H04L 67/10 701/23 |
| 2016/0101785 A1* | 4/2016 | Takahashi | ................ | G06K 9/00791 701/31.4 |
| 2016/0144859 A1* | 5/2016 | Yoo | ................ | B60W 30/0956 701/25 |
| 2016/0171885 A1* | 6/2016 | Lynch | ................ | G08G 1/0129 701/117 |
| 2016/0313133 A1* | 10/2016 | Zeng | ................ | B60W 30/0956 |
| 2016/0355178 A1* | 12/2016 | Shiraishi | ................ | B60W 30/06 |
| 2017/0074900 A1* | 3/2017 | Kondoh | ................ | G01P 21/02 |
| 2017/0116487 A1* | 4/2017 | Yamazaki | ................ | G05D 1/0251 |
| 2017/0131107 A1* | 5/2017 | Kondoh | ................ | G01S 19/47 |
| 2017/0199274 A1* | 7/2017 | Sasabuchi | ................ | G01S 13/867 |
| 2017/0210378 A1* | 7/2017 | Gunaratne | ................ | B60W 10/18 |
| 2017/0217422 A1* | 8/2017 | Nakamura | ................ | B60W 30/09 |
| 2017/0270799 A1* | 9/2017 | Takeda | ................ | B62D 15/02 |
| 2018/0052458 A1* | 2/2018 | Tsuji | ................ | B60W 50/14 |
| 2018/0281785 A1* | 10/2018 | Berntorp | ................ | B60W 30/0956 |
| 2018/0284785 A1* | 10/2018 | Berntorp | ................ | G06K 9/00805 |
| 2018/0307921 A1* | 10/2018 | Vallespi-Gonzalez | ................ | G01S 17/89 |
| 2019/0005821 A1* | 1/2019 | Matsunaga | ................ | G08G 1/165 |
| 2019/0049974 A1* | 2/2019 | Kato | ................ | G08G 1/166 |
| 2019/0061746 A1* | 2/2019 | Abinger | ................ | E05F 15/77 |
| 2019/0084562 A1* | 3/2019 | Schroeder | ................ | B60W 30/08 |
| 2019/0100199 A1* | 4/2019 | Ueda | ................ | B60W 40/02 |
| 2019/0118808 A1* | 4/2019 | Kawasaki | ................ | B60W 60/001 |
| 2019/0126927 A1* | 5/2019 | Uejima | ................ | B60W 30/18163 |
| 2019/0164296 A1* | 5/2019 | Chikkerur | ................ | G06K 9/623 |
| 2019/0168732 A1* | 6/2019 | Tashiro | ................ | F02D 41/107 |
| 2019/0204088 A1* | 7/2019 | Haque | ................ | G06N 3/0454 |
| 2019/0266516 A1* | 8/2019 | Olabiyi | ................ | G08G 1/0129 |
| 2019/0291727 A1* | 9/2019 | Shalev-Shwartz | ................ | B60W 30/0956 |
| 2019/0344804 A1* | 11/2019 | Motomura | ................ | G05D 1/0088 |
| 2019/0354107 A1* | 11/2019 | Kato | ................ | G08G 1/167 |
| 2019/0369637 A1* | 12/2019 | Shalev-Shwartz | ................ | G06K 9/00791 |
| 2020/0001867 A1* | 1/2020 | Mizutani | ................ | B60W 10/04 |
| 2020/0001878 A1* | 1/2020 | Tashiro | ................ | B60W 10/06 |
| 2020/0010088 A1* | 1/2020 | Kokaki | ................ | B60W 10/18 |
| 2021/0056713 A1* | 2/2021 | Rangesh | ................ | G06K 9/6267 |
| 2021/0107494 A1* | 4/2021 | Silver | ................ | B60W 50/06 |

* cited by examiner

| KINDS OF INTENTIONS | EVALUATION VALUE |
|---|---|
| ① MAINTAIN RELATIVE LOCATION | |
| ② RELATIVELY DECELERATE | |
| ③ RELATIVELY ACCELERATE | |
| ④ MOVE TO REAR SIDE OF HOST VEHICLE | |
| ⑤ MOVE TO FRONT SIDE OF HOST VEHICLE | |
| ⑥ OVERTAKE TO LEFT SIDE OF HOST VEHICLE | |
| ⑦ OVERTAKE TO RIGHT SIDE OF HOST VEHICLE | |

FIG. 4B

| KINDS OF INTENTIONS | EVALUATION VALUE |
|---|---|
| ① MAINTAIN RELATIVE LOCATION | ▬▬▬▬▬▬ |
| ② RELATIVELY DECELERATE | ▬▬▬▬▬▬▬▬ |
| ④ MOVE TO REAR SIDE OF HOST VEHICLE | ▬▬▬ |

SYSTEM AND METHOD FOR CREATING DRIVING ROUTE OF VEHICLE

CROSS-REFERENCE TO RELATED APPLICATION

This application claims priority to and the benefit of Korean Patent Application No. 10-2017-0174288, filed on Dec. 18, 2017, which is incorporated herein by reference in its entirety.

FIELD

The present disclosure relates to a system and a method for creating a driving route of a vehicle.

BACKGROUND

The statements in this section merely provide background information related to the present disclosure and may not constitute prior art.

In recent years, in the automotive industry, studies for surrounding vehicle recognition methods and lane recognition methods for reducing a danger of accidents have been actively made.

In general, the detection of lanes and surrounding vehicles is based on images captured through cameras or sensors provided in the vehicle.

However, in the method of detecting lanes and surrounding vehicles based on a camera or a sensor, lanes and surrounding vehicles cannot be properly detected due to external environment such as weather or external brightness. For example, lanes on the road may be easily detected in the clear weather, but the camera or the sensor cannot detect the lanes or may detect only the lanes of a narrow field of view when the surrounding is dark or in a bad weather situation due to snow or rain. Further, lanes may not be easily detected through an image captured through a camera or a sensor due to back light even when the sunlight is strong.

Accordingly, radar sensors or vision sensors are mainly used as the sensors for the vehicles, but studies on methods for recognizing surrounding vehicles through a communication technique between vehicles have been made due to the limits of the sensors.

In the surrounding vehicle recognition methods according to the related art, the surrounding vehicles may be recognized based on images captured through cameras or sensors, or the locations of the surrounding vehicles may be estimated or whether the lanes may be changed may be recognized, by using the speeds and the locations of the surrounding vehicles.

That is, in the surrounding vehicle recognition methods and the method for creating driving routes for changing lanes according to the related art, a danger of collision between the host vehicle and the surrounding vehicles may be increased by allowing the host vehicle to change the lanes while the host vehicle does not determine the intentions of the surrounding vehicles of changing the lanes and the changes of the speeds of the surrounding vehicles.

SUMMARY

The present disclosure provides a system and a method for creating a driving route of a vehicle. The system and method may search for a space for changing a lane of a host vehicle and/or create a driving route by determining an intention of a surrounding vehicle when the surrounding vehicle travels as well as a speed and a location of the surrounding vehicle. In particular, the system and method may create a predicted driving route of the surrounding vehicle according to the determined intention, and create a driving route of the host vehicle, by which the created predicted driving route of the surrounding vehicle may be avoided, thereby reducing a danger of collision between the host vehicle and the surrounding vehicle and also avoiding a dangerous situation when the lane of the host vehicle is changed.

In accordance with an aspect of the present disclosure, the system for creating a driving route of a vehicle may include: a vehicle selecting device configured to select a surrounding vehicle that is adjacent to a host vehicle, an intention determining device configured to determine an intention of the surrounding vehicle by using information including a location and a speed of the surrounding vehicle, a driving route predicting device configured to predict a driving route of the surrounding vehicle according to the determined intention of the surrounding vehicle, a map creating device configured to create a map by using the predicted driving route of the surrounding vehicle, and a driving route creating device configured to create a driving route of the host vehicle.

In one form, the vehicle selecting device may select a surrounding vehicle connected to the host vehicle by using Delaunay triangulation.

In another form, the intention determining device may determine the intention of the surrounding vehicle by using information including the location and the speed of the surrounding vehicle. The location may include a transverse location and a longitudinal location of the surrounding vehicle, and the speed may include a transverse speed and a longitudinal speed of the surrounding vehicle.

In still another form, the intention determining device may determine the intention of the surrounding vehicle by using a determination part created through deep learning or machine learning.

In one form, the intention determining device may classify the determined intention of the surrounding vehicle into kinds of a plurality of intentions by using the determination part.

In another form, the determination part may calculate evaluation values from the kinds of the plurality of intentions.

In still another form, the intention determining device may select the evaluation values according to difference of variances between the kinds of the plurality of intentions.

In other form, the intention determining device may determine the intention of the surrounding vehicle by using a grid map of surrounding vehicles.

In particular, the map creating device may create the predicted driving route of the surrounding vehicle by generating a circular distribution or an elliptical distribution over time, and may create a grid map by using the generated circular or elliptical distribution.

In one form, the map creating device may change a range of the predicted driving route of the surrounding vehicle to be wider as time passes.

In another form, the driving route creating device may create the driving route of the host vehicle by using the grid map.

In accordance with another aspect of the present disclosure, a method for creating a driving route of a vehicle may include: selecting, by a vehicle selecting device, a surrounding vehicle that is adjacent to a host vehicle; determining, by an intention determining device, an intention of the surrounding vehicle by using information including a location and a speed of the surrounding vehicle; predicting, by a driving route predicting device, a driving route of the surrounding vehicle based on the determined intention of the surrounding vehicle; creating, by a map creating device, a grid map by using the predicted driving route of the surrounding vehicle; and creating, by a driving route creating device, a driving route of the host vehicle.

In one form, the step of selecting the surrounding vehicle may include selecting a surrounding vehicle connected to the host vehicle by using Delaunay triangulation.

In another form, in the step of determining the intention of the surrounding vehicle, the location of the surrounding vehicle includes a transverse location and a longitudinal location of the surrounding vehicle, and the speed of the surrounding vehicle includes a transverse speed and a longitudinal speed of the surrounding vehicle.

In one form, the step of determining the intention of the surrounding vehicle may include determining the intention of the surrounding vehicle by using a determination part created through deep learning or machine learning.

In another form, the step of determining the intention of the surrounding vehicle may include classifying the determined intention of the surrounding vehicle into kinds of a plurality of intentions by using the determination part In other form, the step of determining the intention of the surrounding vehicle may include calculating evaluation values from the kinds of the plurality of intentions.

In still other form, the step of determining the intention of the surrounding vehicle may include selecting the evaluation values based on difference of variances between the kinds of the plurality of intentions In one form, the step of creating the grid map may include creating the predicted driving route of the surrounding vehicle by generating a circular distribution or an elliptical distribution over time, and creating a grid map by using the generated circular or elliptical distribution.

In another form, the step of creating the grid map may include changing a range of the predicted driving route of the surrounding vehicle to be wider as time passes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 4B is a table illustrating classified inventions of surrounding vehicles in one form of the present disclosure;

Figure 1:
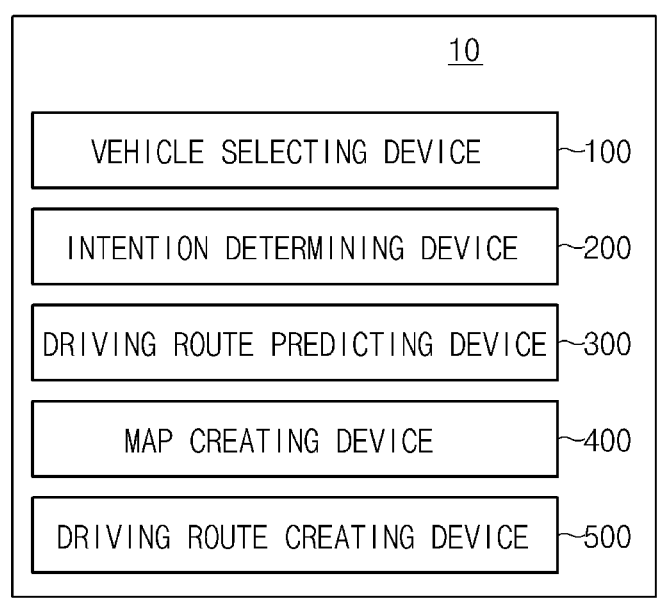
FIG. 1 is a diagram illustrating a system for creating a driving route of a vehicle in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a diagram illustrating a system for creating a driving route of a vehicle in one form of the present disclosure.

Referring to FIG. 1, a system 10 for creating a driving route of a vehicle includes a vehicle selecting device 100, an intention determining device 200, a driving route predicting device 300, a map creating device 400, and a driving route creating device 500.

The vehicle selecting device 100 selects a surrounding vehicle that is adjacent to a host vehicle 1 and influences the host vehicle 1. For example, the vehicle selecting device 100 may select a surrounding vehicle connected to the host vehicle 1 by using Delaunay triangulation, after observing the surrounding vehicle for a specific period of time.

For example, the vehicle selecting device 100 may select one surrounding vehicle on the front side of the host vehicle 1, may select one surrounding vehicle on the rear side of the host vehicle 1, may select two surrounding vehicles on the front lateral sides of the host vehicle 1, and may select two surrounding vehicles on the rear lateral sides of the host vehicle 1.

For example, the vehicle selecting device 100 may select one surrounding vehicle on the front side of the host vehicle 1, may select one surrounding vehicle on the rear side of the host vehicle 1, may select one surrounding vehicle on the left side of the host vehicle 1, may select one surrounding vehicle on the right side of the host vehicle 1, may select two surrounding vehicles on the front lateral sides of the host vehicle 1, and may select two surrounding vehicles on the rear lateral sides of the host vehicle 1.

In Delaunay triangulation, the vehicle selecting device 100 may represent a connection relationship between the host vehicle 1 and the surrounding vehicle by using display symbols including a solid line, a thick dotted line, or a thin dotted line between the host vehicle 1 and the surrounding vehicle. Here, the vehicle selecting device 100 of the system for creating a driving route of a vehicle will be described in detail with reference to FIGS. 2A-2B and 3A-3C.

The intention determining device 200 determines an intention (a driving intention) of a surrounding vehicle by using information including locations (p) and speeds (v) of the surrounding vehicles corresponding to a time (t) and a grid map of the surrounding vehicles. Here, the intention determining device 200 of the system for creating a driving route of a vehicle will be described in detail with reference to FIGS. 4A and 4B.

The driving route predicting device 300 predicts a driving route of the surrounding vehicle according to the intention determined by the intention determining device 200. For example, the driving route predicting device 300 may predict a driving route of the surrounding vehicle according to the intention determined by using a bicycle model. For example, a first driving route according to the determined intention may include an intention of the surrounding vehicle maintaining a relative location, a second driving route according to the determined intention may include an intention of the surrounding vehicle decelerating relatively, a fourth driving route according to the determined intention may include an intention of the surrounding vehicle moving to the rear side of the host vehicle, and various driving routes according to the determined intention may be set, which is a simple example for helping understanding of the present disclosure, and the present disclosure is not limited thereto.

Here, the driving route predicting device 300 of the system for creating a driving route of a vehicle according to an form of the present disclosure will be described in detail with reference to FIG. 5.

The map creating device 400 creates the predicted driving routes of the surrounding vehicles with a grid map (e.g., a 2-dimensional grid map).

The map creating device 400 may represent the predicted driving routes of the surrounding vehicles after changing locations (displacements) of the surrounding vehicles in the grip map according to specific times including t+1, t+2, t+3, and t+4 with respect to a reference time (t), which is a simple example for helping understanding of the present disclosure, and the present disclosure is not limited thereto.

For example, the map creating device 400 may create a detailed driving route expressed with the grip map by using a predicted driving route of a first surrounding vehicle 11 (a first target vehicle) of the classified surrounding vehicles, a predicted driving route of a second surrounding vehicle 12 (a second target vehicle) of the classified surrounding vehicles, a predicted driving route of a third surrounding vehicle 13 (a third target vehicle) of the classified surrounding vehicles, and a predicted driving route of a fourth surrounding vehicle 14 (a fourth target vehicle) of the classified surrounding vehicles. Here, the map creating device 400 of the system for creating a driving route of a vehicle according to an form of the present disclosure will be described in detail with reference to FIGS. 6A-6C.

The driving route creating device 500 creates an optimum driving route of the host vehicle 1 corresponding to the intention of the surrounding vehicle by using the grid map created by the map creating device 400. Here, the driving route crating device 500 of the system for creating a driving route of a vehicle will be described in detail with reference to FIG. 7.

FIGS. 2A-2B and 3A-3C are views illustrating a vehicle selecting device of a system for creating a driving route of a vehicle in one form of the present disclosure.

The vehicle selecting device 100 selects a surrounding vehicle that is adjacent to a host vehicle 1 and influences the host vehicle 1. For example, the vehicle selecting device 100 may select a surrounding vehicle connected to the host vehicle 1 by using Delaunay triangulation, after observing the surrounding vehicle for a specific period of time.

That is, the vehicle selecting device 100 may determine a location of the surrounding vehicle at a location of the host vehicle 1 by using Delaunay triangulation.

For example, the vehicle selecting device 100 may estimate a location of the surrounding vehicle from an image captured by a stereo camera provided in the host vehicle 1 that travels in an arbitrary lane. In order to estimate a location of the surrounding vehicle by using Delaunay triangulation, the vehicle selecting device 100 may extract feature points from a first image frame and a second image frame captured by the stereo camera and may adjust the feature point of the second image frame corresponding to the feature point of the first image frame.

The vehicle selecting device 100 may calculate 2-dimensional coordinates, that is, x coordinates and y coordinates of the feature points from the first image frame and the second image frame after adjusting the feature points, may calculate distances from the stereo camera provided in the host vehicle 1 to the feature points by using Delaunay triangulation, and may calculate 3-dimensional coordinates by calculating the calculated distances as depth values, that is, z coordinates.

After calculating the 3-dimensional coordinates, the vehicle selecting device 100 may calculate a motion vector that means a conversion rate of an actual space through 3-dimensional coordinates of a previous 3-dimensional image frame and 3-dimensional coordinates of a current 3-dimensional image frame, and may group the vector based on a space correlation on a feature space in which a movement direction of the motion vector is a parameter to constitute one or more clusters. Thereafter, the vehicle selecting device 100 constitutes one or more motion clusters, from which noise is removed, by eliminating outliers from the motion clusters. The vehicle selecting device 100 may estimate a location of a surrounding vehicle by tracking relative locations of a camera calculated for the motion clusters with the assumption that the surrounding vehicle travels at a specific speed, and may calculate translation information representing linear motions for the 3-dimensional coordinate axes and rotation information representing rotations around the 3-dimensional coordinate axes with change rates of the 3-dimensional coordinates of the previous image frame and the 3-dimensional coordinates of the current image frame to estimate the calculated translation information and rotation information as the location of the surrounding vehicle.

Figure 2A:
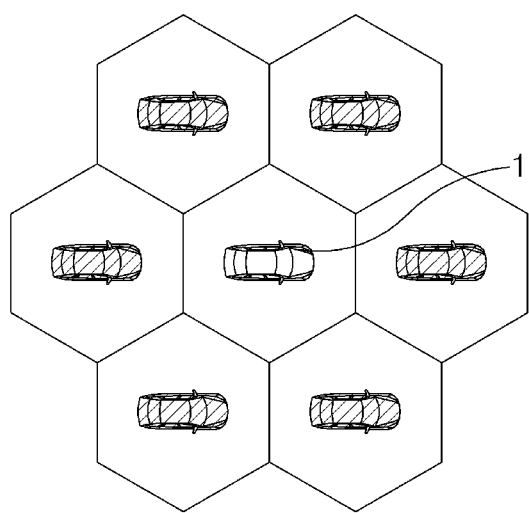
FIGS. 2A-2B and 3A-3C are views illustrating a vehicle selecting device of a system for creating a driving route of a vehicle in one form of the present disclosure.

Referring to FIG. 2A, the vehicle selecting device 100 may select one surrounding vehicle on the front side of the host vehicle 1, may select one surrounding vehicle on the rear side of the host vehicle 1, may select two surrounding vehicles on the front lateral sides of the host vehicle 1, and may select two surrounding vehicles on the rear lateral sides of the host vehicle 1.

Figure 2B:
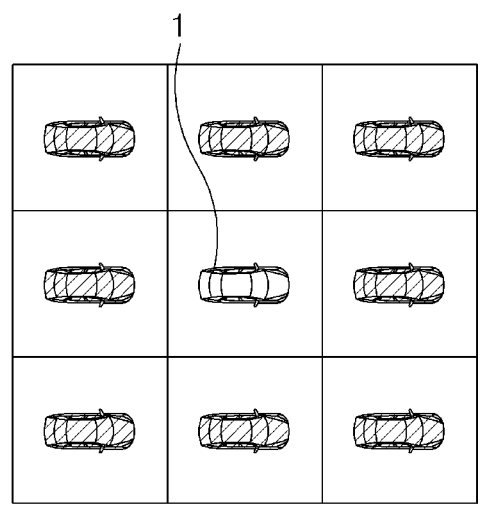

Referring to FIG. 2B, the vehicle selecting device 100 may select one surrounding vehicle on the front side of the host vehicle 1, may select one surrounding vehicle on the rear side of the host vehicle 1, may select one surrounding vehicle on the left side of the host vehicle 1, may select one surrounding vehicle on the right side of the host vehicle 1, may select two surrounding vehicles on the front lateral sides of the host vehicle 1, and may select two surrounding vehicles on the rear lateral sides of the host vehicle 1.

Figure 3A:
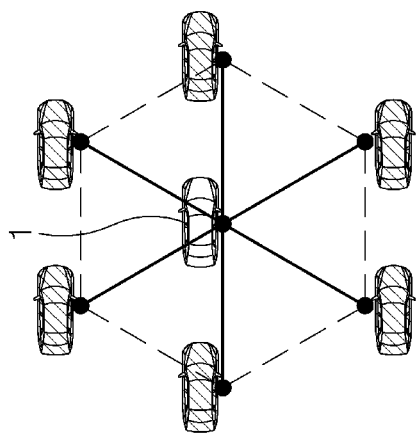
Figure 3B:
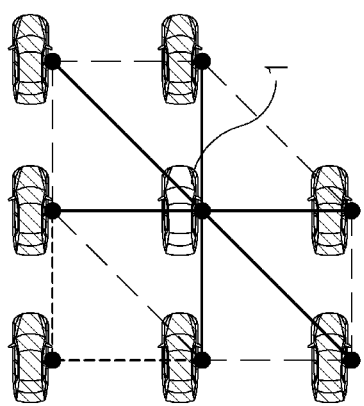
Figure 3C:
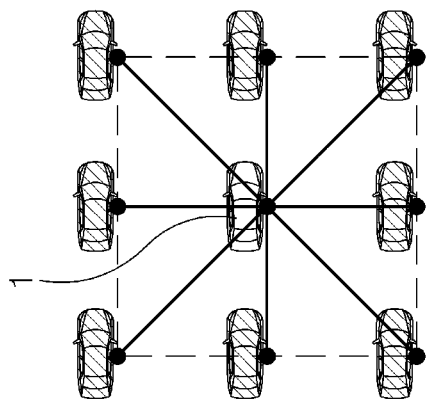

Referring to FIGS. 3A, 3B, and 3C, the vehicle selecting device 100 may represent a connection relationship between the host vehicle 1 and the surrounding vehicles by using display symbols including solid lines, thick dotted lines, or thin dotted lines between the host vehicle 1 and the surrounding vehicles. Here, the solid lines are line connecting the host vehicle 1 and the surrounding vehicles, the thick dotted lines are lines between the points connected to the host vehicle 1, and the thin dotted lines are lines including points connected to surrounding vehicles that are not connected to the host vehicle 1.

Figure 4A:
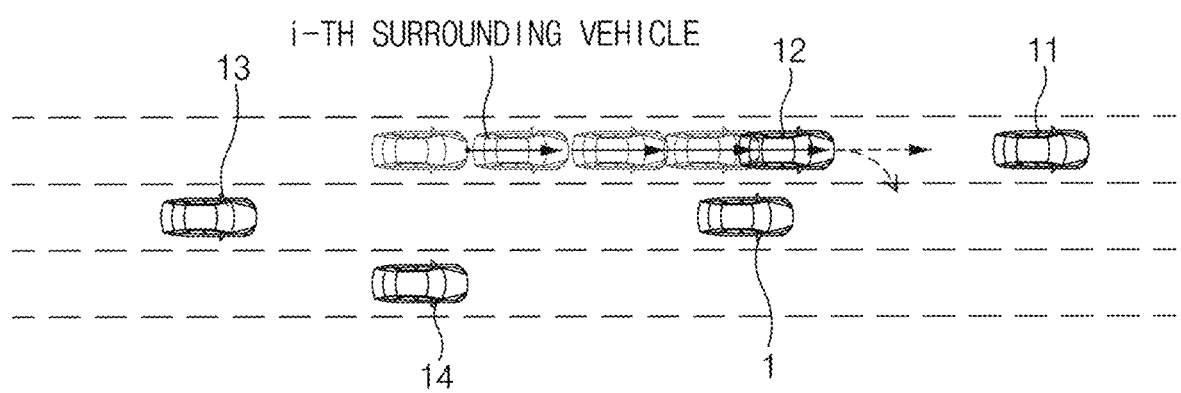
FIG. 4A is a view illustrating an intention determining device of a system for creating a driving route of a vehicle in one form of the present disclosure.

FIG. 4A is a view illustrating an intention determining device of a system for creating a driving route of a vehicle in one form of the present disclosure.

Referring to FIGS. 4A and 4B, the intention determining device 200 determines intentions (driving intentions) of surrounding vehicles by using information including locations (p) and speeds (v) of the surrounding vehicles 11, 12, 13, and 14 corresponding to a time (t) as in the following equation and a grid map of the surrounding vehicles (or surrounding objects). Here, in the method for determining intentions of surrounding vehicles, the intentions of the surrounding vehicles may be determined by using a deep learning scheme or a machine learning scheme. For example, the deep learning scheme or the machine learning scheme is a set of machine learning algorithms for determining the intentions of surrounding vehicles at a high level through combination of a plurality of nonlinear conversion techniques, and may include a machine learning technology of learning the way of thinking of a person or a driver by a computer.

For example, the information including the locations (p) and the speeds (v) of the surrounding vehicles may include transverse locations, longitudinal locations, transverse speeds, and longitudinal speeds of the surrounding vehicles, which is a simple example for helping understanding of the present disclosure, and the present disclosure is not limited thereto.

$$x^i = \begin{bmatrix} x_t^i \\ \vdots \\ x_{t-(N-1)}^i \end{bmatrix}, x_t^i = \begin{bmatrix} p_{x,t}^i \\ p_{y,t}^i \\ v_{x,t}^i \\ v_{y,t}^i \end{bmatrix}$$ [Equation]

Here, i denotes an i-th surrounding vehicle (target vehicle) and is a vehicle selected by the vehicle selecting device 100, N denotes a movement step of the surrounding vehicle or an object according to a time (t), $x_t^i$ denotes a location of the i-th surrounding vehicle or the object at the time (t), and a $x_t^i$ vector may be represented by a transverse location ($P_x,t^i$), a longitudinal location ($P_y,t^i$), a transverse speed ($V_x,t^i$), and a longitudinal speed ($V_y,t^i$) of the surrounding vehicle or the object.

For example, when N is 6, the intention determining device 200 receives transverse locations, longitudinal locations, transverse speeds, and longitudinal speeds of the surrounding vehicles till the current movement steps of the surrounding vehicles from the 5-th movement step (N−1) of the surrounding vehicles, and may determine the detailed intentions of the surrounding vehicles by using the grid map of the surrounding vehicles.

For example, when N is 6, the intention determining device 200 may obtain a total of 24 vector values by multiplying $x^i$ of N (e.g., N is 6) and information including the locations and the speeds of the surrounding vehicles (e.g., values including the transverse locations, the longitudinal locations, the transverse speeds, and the longitudinal speeds of the surrounding vehicles).

The intention determining device 200 determines an intention of a surrounding vehicle by using information including a location (p) and a speed (v) of the surrounding vehicle corresponding to a time (t) and a grid map of the surrounding vehicle. Here, the information including the locations (p) and the speeds (v) of the surrounding vehicles and the information on the grid map of the surrounding vehicles may be transmitted and received through communication (e.g., V2V communication) between the host vehicle 1 and the surrounding vehicles.

For example, the intention determining device 200 may classify the kinds (e.g., the kinds of seven intentions as shown in FIG. 4B) through a determination part corresponding to the determined intentions of the surrounding vehicles, calculates evaluation values according to the detailed classified kinds of the intentions, and may select some of the kinds of the detailed intentions.

For example, the determination part may classify the kinds of the detailed intentions by using a recursive neutral network (RNN) or a hidden Markov Model (HMM). Data on the kinds of the detailed intentions may be marked by developers, and may be automatically created by using a machine learning scheme (machine learning classification scheme). For example, the recursive neutral network (RNN) may analyze several words given as an input value while binding the words and may classify the kinds of the detailed intentions by using the analyzed words, and because the recursive neural network or the hidden Markov Model (HMM) are general technologies, a detailed description thereof will be omitted.

For example, the determination part may calculate evaluation values in the kinds of the detailed intentions, and may represent the sizes (numeric values) of the calculated evaluation values. That is, the determination part may represents the sizes of the evaluation values in the form of a bar graph as shown in FIG. 4B, and the sizes of the evaluation values may become 1 by normalizing the total sum of the evaluation values and may be set to a range of 1 to 10, which is a simple example for helping understanding of the present disclosure, and the present disclosure is not limited thereto.

The intention determining device 200 may classify the kinds of the detailed intentions to an intention of a surrounding vehicle maintaining a relative location, an intention of a surrounding vehicle relatively decelerating, an intention of a surrounding vehicle relatively accelerating, an intention of moving to the rear side of the host vehicle 1, an intention of moving to the front side of the host vehicle 1, an intention of overtaking the host vehicle 1 on the left side of the host vehicle 1, and an intention of overtaking the host vehicle 1 on the right side of the host vehicle 1, and the evaluation values may be differently created according to the kinds of the detailed intentions.

The intention determining device 200 may determine the number of the intentions of the surrounding vehicle, which may be selected to predict a driving route of the surrounding vehicle according to a mean and a variance. For example, the mean is an average value of the values measured by repeating the determinations of the intentions by the intention determining device 200, and the variance is a difference of the evaluation values of the element (Tables ① to ⑦ in FIG. 4B) of the kinds of the intentions.

For example, the intention determining device 200 may select two evaluation values that is greater than an average value if a difference of variances between the elements of the kinds of the intentions is large (if the variance is high) and may select three evaluation values that is greater than the average value if a difference of variances between the elements of the kinds of the intentions is small (if the variance is low), which is a simple example for helping understanding of the present disclosure, and the present disclosure is not limited thereto.

For example, when the evaluation values of the kinds of the intentions is 0.40, 0.30, 0.05, 0.03, 0.07, 0.05, and 0.10, the variance is 0.018, and the intention determining device 200 may select two evaluation values (the kinds of two intentions) that is greater than an average value (e.g., 0.148) while determining that the variance is a high value.

For example, when the evaluation values of the kinds of the intentions is 0.23, 0.25, 0.05, 017, 0.07, 0.10, and 0.13, the variance is 0.005, and the intention determining device 200 may select three evaluation values (the kinds of three intentions) that are smaller than an average value while determining that the variance is a low value.

Figures 5A, 5B:
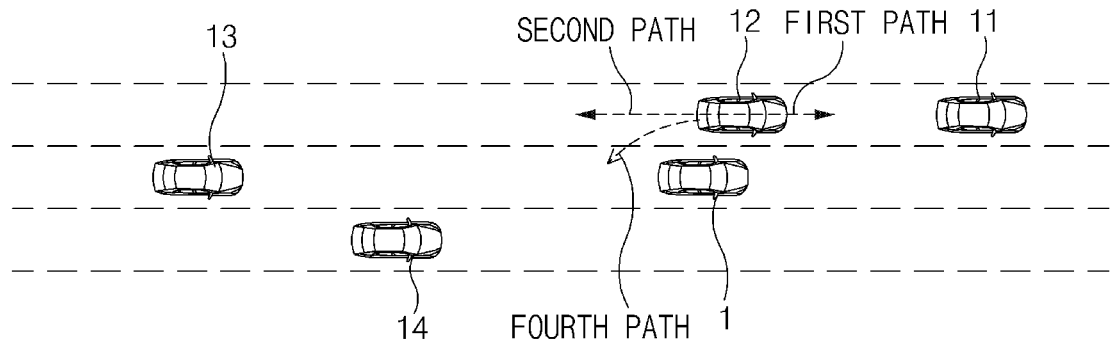
FIGS. 5A-5B are views illustrating a driving route predicting device of a system for creating a driving route of a vehicle in one form of the present disclosure.

FIGS. 5A-5B are views illustrating a driving route predicting device of a system for creating a driving route of a vehicle in one form of the present disclosure.

Referring to FIGS. 5A and 5B, the driving route predicting device 300 may predict the driving routes of the surrounding vehicles 11, 12, 13, and 14 according to the intention determined by the intention determining device 200. For example, the driving route predicting device 300 may predict a driving route of the surrounding vehicle according to the intention determined by using a bicycle model. Here, the method for predicting the driving routes of the surrounding vehicles according to the intentions determined by using the bicycle model may use a dynamic model that uses parameters of the surrounding vehicles, and the bicycle model may create detailed driving routes of the surrounding vehicles by using transverse motions of the surrounding vehicles and yawing around vertical axes that pass through the central points of the surrounding vehicles.

For example, the driving route predicting device 300 may predict a first driving route including the intention of the surrounding vehicle 12 maintaining a relative location, among the kinds of the intentions determined by the intention determining device 200, may predict a second driving route including the intention of the surrounding vehicle 12 relatively decelerating, among the kinds of the intentions determined by the intention determining device 200, and may predict a fourth driving route including the intention of the surrounding vehicle 12 moving to the rear side of the host vehicle 1, among the kinds of the intentions determined by the intention determining device 200, which is a simple example for helping understanding of the present disclosure, and the present disclosure is not limited thereto.

Figure 6A:
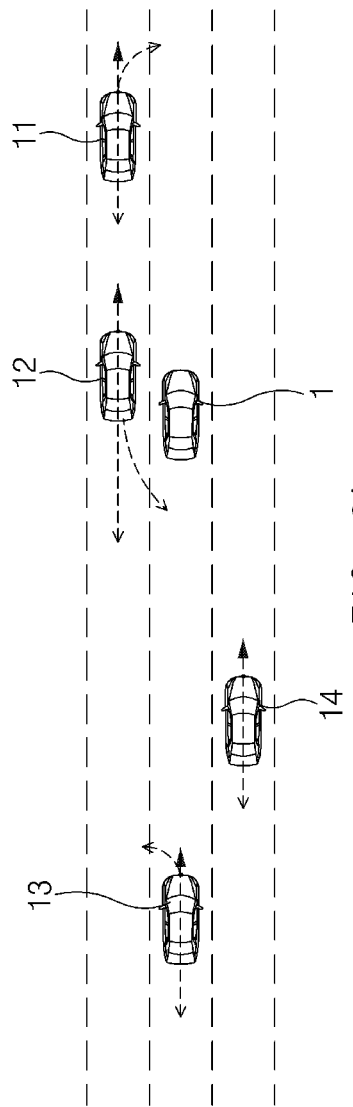
FIGS. 6A-6C are views illustrating a map creating device of a system for creating a driving route of a vehicle in one form of the present disclosure.
Figure 6B:
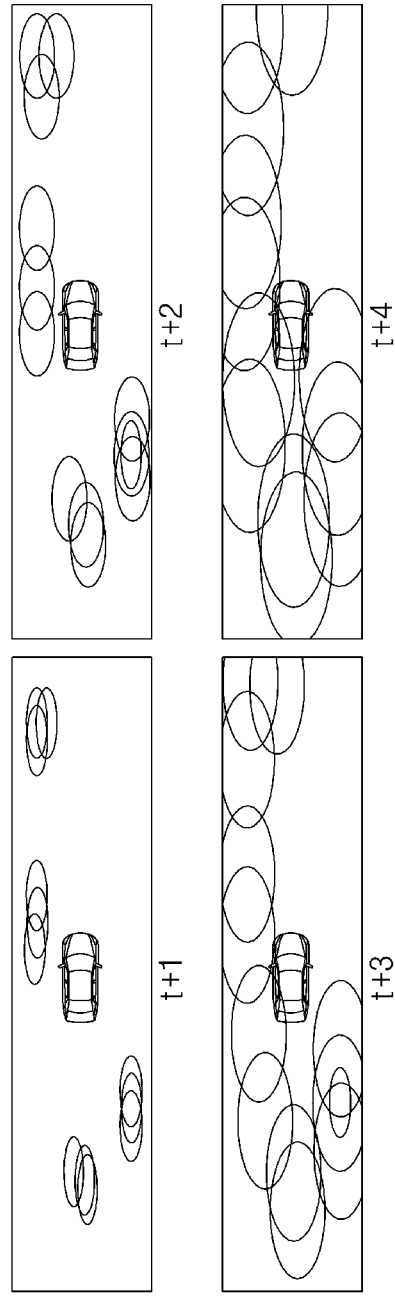
Figure 6C:
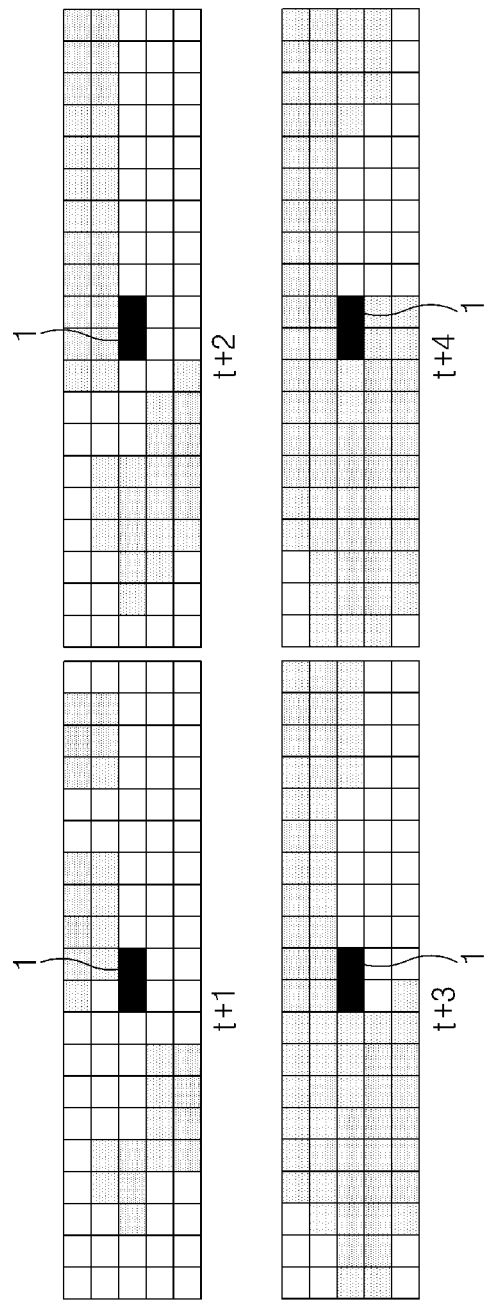

FIGS. 6A-6C are views illustrating a map creating device of a system for creating a driving route of a vehicle in one form of the present disclosure.

Referring to FIGS. 6A, 6B, and 6C, the map creating device 400 creates a grip map by using the predicted driving routes of the surrounding vehicles. Here, the grid map may be a 2-dimensional grid map.

Referring to FIG. 6A, the map creating device 400 may create the predicted driving routes of the surrounding vehicles.

For example, the predicted first driving route of the first surrounding vehicle 11 may include an intention of the first surrounding vehicle 11 maintaining a relative location, the second driving route of the first surrounding vehicle 11 may include an intention of the first surrounding vehicle 11 relatively decelerating, and the fifth driving route of the first surrounding vehicle 11 may be an intention of the first surrounding vehicle 11 moving to the front side of the host vehicle 1.

For example, the predicted first driving route of the second surrounding vehicle 12 may include an intention of the second surrounding vehicle 12 maintaining a relative location, the second driving route of the second surrounding vehicle 12 may include an intention of the second surrounding vehicle 12 relatively decelerating, and the fourth driving route of the second surrounding vehicle 12 may be an intention of the second surrounding vehicle 12 moving to the rear side of the host vehicle 1.

For example, the predicted first driving route of the third surrounding vehicle 13 may include an intention of the third surrounding vehicle 13 maintaining a relative location, the second driving route of the third surrounding vehicle 13 may include an intention of the third surrounding vehicle 13 relatively decelerating, and the sixth driving route of the third surrounding vehicle 13 may be an intention of the third surrounding vehicle 13 moving to the left side of the host vehicle 1 to overtake the host vehicle 1.

For example, the predicted first driving route of the fourth surrounding vehicle 14 may include an intention of the fourth surrounding vehicle 14 maintaining a relative location, and the second driving route of the fourth surrounding vehicle 14 may include an intention of the fourth surrounding vehicle 14 relatively decelerating.

Referring to FIG. 6B, the map creating device 400 creates a change of the locations (displacements) of the surrounding vehicles over time in the predicted driving routes of the surrounding vehicles in a circular or elliptical distribution, and the reference of the circular or elliptical distribution is a Gaussian distribution (Gaussian 2sigma distribution) and the 2-dimensional Gaussian distribution is a continuous probability distribution and may be expressed as location values having a circular or elliptical probability by using 2-dimensional data (for example, x1 and x2).

Referring to FIG. 6C, the map creating device 400 may create a circular or elliptical distribution (a distribution in which the predicted driving route of the surrounding vehicle changes according to specific times including t+1, t+2, t+3, and t+4 with respect to a reference time (t)) in a uniform space in the grid map. Here, the grid map means a grid map having a uniform space including horizontal and vertical lines for creating the measured locations of the surrounding vehicles.

For example, the map creating device 400 may change a range of the predicted driving route of the surrounding vehicle created wider as specific times, such as t+1, t+2, t+3, and t+4, elapses from a reference time (t). For example, the map creating device 400 may create a grid map for all driving routes of the surrounding vehicles while rotating 360 degrees at a rotational speed that changes dynamically. Further, the map creating device 400 may allow grid points to appear at a specific interval on the grid map through the rotation speed that changes dynamically, and the map creating device 400 may primarily make a map while rotating and may secondarily finish the grid map while rotating again with respect to a nonlinear zone.

Figure 7:
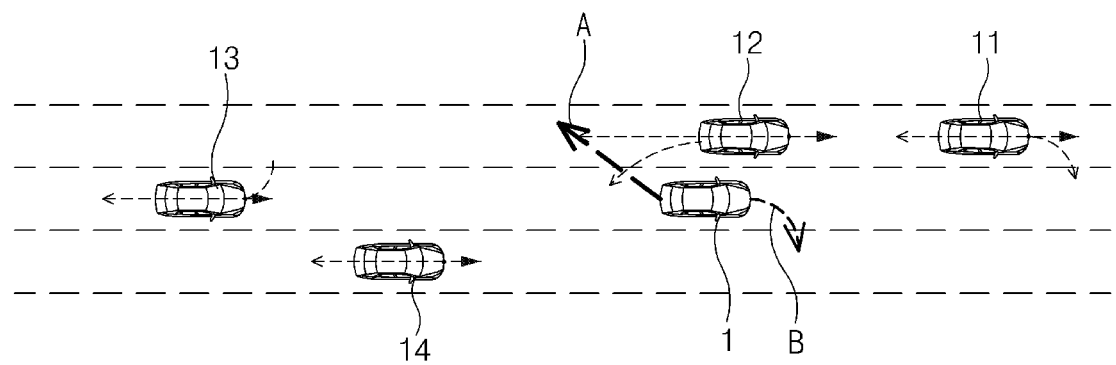
FIG. 7 is a view illustrating a final driving route created by a driving route creating device of a system for creating a driving route of a vehicle in one form of the present disclosure.

FIG. 7 is a view illustrating a final driving route created by a driving route creating device of a system for creating a driving route of a vehicle in one form of the present disclosure.

Referring to FIG. 7, the driving route creating device 500 creates an optimum driving route of the host vehicle 1 corresponding to the predicted driving routes of the surrounding vehicles 11, 12, 13, and 14 by using the grid map created by the map creating device 400. For example, the driving route creating device 500 may create a driving route (A) that may go straight forwards while decelerating the host vehicle 1 when the host vehicle 1 changes the lane to the left side, or may create a driving route (B) that may go straight forwards while accelerating the host vehicle 1 because the surrounding vehicle 14 may approach the host vehicle 1 when the host vehicle 1 change the lane to the right side.

Figure 8:
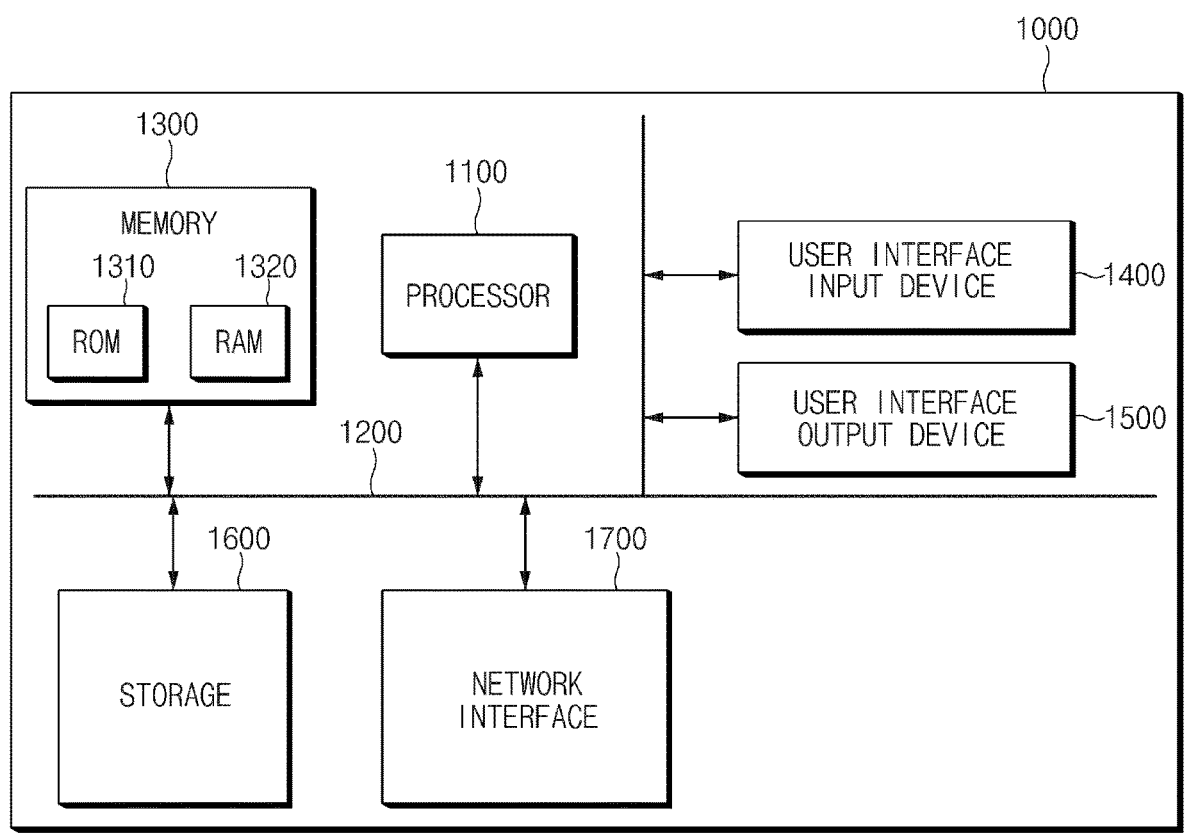
FIG. 8 is a schematic diagram illustrating a computing system that executes a system for creating a driving route of a vehicle in one form of the present disclosure.

FIG. 8 is a view illustrating a computing system that executes a system for creating a driving route of a vehicle in one form of the present disclosure.

Referring to FIG. 8, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the forms of the present disclosure may be implemented directly by hardware executed by the processor 1100, a software module, or a combination thereof. The software module may reside in a storage medium (that is, the memory 1300 and/or the storage 1600), such as a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The present disclosure may determine an intention of a surrounding vehicle when the surrounding vehicle travels and create a predicted driving route of the surrounding vehicle according to the determined intention, and may create a driving route of a host vehicle that may avoid the created predicted driving route of the surrounding vehicle or create a lane change time point of the host vehicle, thereby decreasing a danger of collision of the host vehicle and the surrounding vehicle.

Further, the present disclosure may create a predicted driving route of a surrounding vehicle and an optimum driving route of a host vehicle according to an intention of the surrounding vehicle, thereby avoiding a dangerous situation when the host vehicle changes the lane.

The above description is a simple exemplification of the technical spirit of the present disclosure, and the present disclosure may be variously corrected and modified by those skilled in the art to which the present disclosure pertains without departing from the desired features of the present disclosure.

Therefore, the disclosed forms of the present disclosure do not limit the technical spirit of the present disclosure but are illustrative, and the scope of the technical spirit of the present disclosure is not limited by the forms of the present disclosure. It will be understood that all the technical spirits within the equivalent range fall within the scope of the present disclosure.

What is claimed is:

1. A system comprising:
   non-transitory memory storing instructions executable to create a driving route of a vehicle; and
   a processor configured to execute the instructions to:
      select a surrounding vehicle that is adjacent to a host vehicle;
      determine an intention of the surrounding vehicle by using information including a location and a speed of the surrounding vehicle;
      predict a driving route of the surrounding vehicle based on the determined intention of the surrounding vehicle;
      create a map by using the predicted driving route of the surrounding vehicle;
      create a driving route of the host vehicle;
      determine a number of intentions of the surrounding vehicle based on a mean value and a variance,
      wherein the mean value is an average value of values measured by repeatedly determining the intention of the surrounding vehicle, and the variance is a difference in evaluation values assigned to elements of kinds of the determined intentions of the surrounding vehicle;
      classify the determined intention of the surrounding vehicle into kinds of a plurality of intentions;
      calculate evaluation values from the kinds of the plurality of intentions; and
      select the evaluation values based on difference of variances between the kinds of the plurality of intentions,
   wherein, when determining the intention of the surrounding vehicle, the processor is further configured to:
      collect a set of information regarding the surrounding vehicle including a transverse location of the surrounding vehicle, a longitudinal location of the surrounding vehicle, a transverse speed of the surrounding vehicle, and a longitudinal speed of the surrounding vehicle; and
      predict the driving route of the surrounding vehicle by feeding a machine learning model with the collected set of information and the selected evaluation values.

2. The system of claim 1, wherein the processor is configured to select the surrounding vehicle connected to the host vehicle by using Delaunay triangulation.

3. The system of claim 1, wherein the processor is configured to determine the intention of the surrounding vehicle by using a grid map of surrounding vehicles.

4. The system of claim 1, wherein the processor is configured to create the predicted driving route of the surrounding vehicle by generating a circular distribution or an elliptical distribution over time, and configured to create a grid map by using the generated circular or elliptical distribution.

5. The system of claim 4, wherein the processor is configured to change a range of the predicted driving route of the surrounding vehicle to be wider as time passes.

6. The system of claim 1, wherein the processor is configured to create the driving route of the host vehicle by using a grid map.

7. A computer-implemented method performed by a processor configured to execute instructions to create a driving route of a vehicle stored in non-transitory memory, the method comprising the steps of:

selecting a surrounding vehicle that is adjacent to a host vehicle;

determining an intention of the surrounding vehicle by using information including a location and a speed of the surrounding vehicle;

predicting a driving route of the surrounding vehicle based on the determined intention of the surrounding vehicle;

creating a grid map by using the predicted driving route of the surrounding vehicle; and creating a driving route of the host vehicle, wherein in determining the intention of the surrounding vehicle includes:

determining a number of intentions of the surrounding vehicle based on a mean value and a variance, and wherein the mean value is an average value of values measured by repeatedly determining the intention of the surrounding vehicle, and the variance is a difference in evaluation values assigned to elements of kinds of the determined intentions of the surrounding vehicle, wherein the step of determining the intention of the surrounding vehicle includes:

classifying the determined intention of the surrounding vehicle into kinds of a plurality of intentions, calculating evaluation values from the kinds of the plurality of intentions, and selecting the evaluation values based on difference of variances between the kinds of the plurality of intentions, and wherein the step of determining the intention of the surrounding vehicle further includes:

collecting a set of information regarding the surrounding vehicle including a transverse location of the surrounding vehicle, a longitudinal location of the surrounding vehicle, a transverse speed of the surrounding vehicle, and a longitudinal speed of the surrounding vehicle; and predicting the driving route of the surrounding vehicle by providing a machine learning model with the collected set of information and the selected evaluation values.

8. The method of claim 7, wherein the step of selecting the surrounding vehicle includes:

selecting the surrounding vehicle connected to the host vehicle by using Delaunay triangulation.

9. The method of claim 7, wherein the step of creating the grid map includes:

creating the predicted driving route of the surrounding vehicle by generating a circular distribution or an elliptical distribution over time; and creating the grid map by using the generated circular or elliptical distribution.

10. The method of claim 9, wherein the step of creating the grid map includes:

changing a range of the predicted driving route of the surrounding vehicle to be wider as time passes.

\* \* \* \* \*